United States Patent Office 3,466,320
Patented Sept. 9, 1969

3,466,320
METHOD FOR THE PREPARATION OF ESTERS OF UNSATURATED ACIDS FROM THE CORRESPONDING NITRILES
Charles W. Hargis, Johnson City, Tenn., assignor to Eastman Kodak Company, Rochester, N.Y., a corporation of New Jersey
No Drawing. Filed June 27, 1967, Ser. No. 649,155
Int. Cl. C07c *69/52;* B01j *11/06*
U.S. Cl. 260—486                5 Claims

ABSTRACT OF THE DISCLOSURE

Alpha,beta-unsaturated esters such as ethyl and methyl methacrylate are prepared in a single step by contacting the corresponding unsaturated nitrile, water, and a lower alkanol with a catalyst, comprising an esterification catalyst and niobium, in the calcined form. The esters are polymerizable to useful thermoplastic resins.

---

This invention relates to an improved process for producing lower esters of alpha,beta-unsaturated acids from the corresponding alpha,beta-unsaturated nitrile by the use of a novel catalyst containing niobium.

A number of proposed methods of preparing unsaturated esters from the corresponding nitriles are known in the art. For example, one process involves an intermediate which is first obtained by the reaction of the corresponding nitrile with a mineral acid in water. The intermediate is then heated with a lower aliphatic alcohol to give the corresponding alkyl acrylate. Another process involves the continuous diffusing of alkanol vapors through a heated acrylonitrile oxyacid intermediate in a series of two or more steps. A third and more attractive method involves the one-step reaction of a mixture of vaporized acrylonitrile, alkanol, and water, concurrently in contact with solid esterification catalysts such as silica, silica-alumina, titania, zirconia, thoria, and the like, with or without phosphoric or molybdic acid additives, and with or without oxidation catalysts such as platinum and nickel. This third process has proved far simpler than the other multi-step processes, but has so far produced disappointingly low yield percentages.

Consequently, it is among the more important objects of the invention to provide a novel process for conversion of alpha,beta-unsaturated nitriles to alpha,beta-unsaturated esters in acceptable and useful yield percentages.

Another object of this invention is the provision of a novel catalyst for converting alpha,beta-unsaturated nitriles to alpha,beta-unsaturated esters.

Another object of this invention is the provision of a one-step process involving the vapor-phase reaction of an unsaturated aliphatic nitrile, alkanol and water in contact with an esterification catalyst and a promoting catalyst of niobium pentoxide to produce the corresponding unsaturated aliphatic ester.

A further object of this invention is the provision of a one-step process whereby alkyl acrylates and alkyl methacrylates are prepared by the reaction of the corresponding nitriles with alcohol and water in contact with an esterification catalyst such as silica, alumni, titania, zirconia, or the like which is in turn promoted by a niobium pentoxide catalyst.

These and other objects, features and advantages of the present invention will become apparent upon considering the following detailed description and illustrative embodiments of the invention.

In the practice of the present invention unsaturated aliphatic nitriles such as acrylonitrile are employed as basic starting materials. These nitrile starting materials may be reperesented by the following formula:

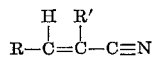

wherein R and R' represent a hydrogen atom or an alkyl radical, preferably the lower alkyls having up to about 10 carbon atoms.

Reacted with the nitrile starting material is an amount of water and a lower aliphatic alcohol containing up to about 8 carbon atoms, the total number of alcohol carbon atoms depending on the ester product desired. The presence of water in the reaction mixture is essential for accomplishing the formation of the desired ester product, and a molar ratio of water to nitrile of at least a value of one is preferable. The ratio of reactant alcohol to reactant nitrile is variable within relatively wide limits without adversely effcting reaction results. Ratios of from about 1:1 to about 1:5 for alcohol to nitrile have been found to be useable with a ratio of about a value of one giving the most advantageous results. Since water is present in the reaction mixture, olefin and/or ether formation from the alcohol is suppressed, thus permitting an increase in the proportion of alcohol to nitrile.

The reaction mixture of unsaturated aliphatic nitrile, lower aliphatic alcohol and water is vaporized and passed through either a conventional tubular reactor containing a fixed catalyst bed or a vessel containing a fluidized bed of catalyst material. If a fluidized bed of catalyst is employed, continuous or periodic removal of spent catalyst for regeneration and replacement with fresh or regenerated catalyst is anticipated.

The catalyst material employed is a novel combination of solid esterification catalyst material enhanced by the promoting effect of a niobium pentoxide catalyst material. Solid esterification catalyst materials useable in this reaction consist of silica, alumina, titana and zirconia or mixtures of these components. Preferably 25–95% of the total weight of the catalyst is made up of esterification catalyst material, the remainder constituting niobium pentoxide catalyst material.

Preferably the niobium pentoxide promoting agent is carried on a solid material support such as silica, alumina, titania and zirconia or mixtures of those components and advantageously constitutes 5–25% of the total weight of the catalyst, as previously stated. However, higher or lower concentrations of the niobium pentoxide promoter are useable.

The combined catalyst, i.e., esterification catalyst annd promoter catalyst, is preferably prepared by mixing an aqueous solution of niobium oxalate with the desired amount of support, part of which will serve as an esterification catalyst and part of which will serve as the solid support for the niobium pentoxide. The water is then evaporated and the resulting mass is calcined at preferably 450° C. to decompose the oxalate to pentoxide.

The vaporized reactant mixture of nitrile, alcohol and water is fed into the catalyst system for a contact time varying from about 1 second to about 75 seconds. Contact time, for the purposes of this disclosure, is defined as the time required for the vaporized reactant mixture to fill an empty volume equal to the bulk volume of the catalyst material at operating conditions. Temperature ranges suitable for this reaction vary from about 150° C. to 500° C., a range of about 200° C. to about 350° C. being preferred. Higher pressures for the reaction than atmospheric are not necessary, but may of course be employed. Pressures high enough to promote polymerization are undesirable.

The unsaturated aliphatic ester reaction product is recovered by conventional means such as by scrubbing the reactor effluent vapors with water or acidified water. These components are then further purified by distillation or other conventional means while unreacted feed materials are recycled back to the reactor.

The alpha,beta-unsaturated ester products obtained from this reaction are represented by the formula:

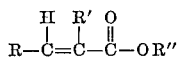

wherein R and R' represent a hydrogen atom or an alkyl radical, preferably having up to about 10 carbon atoms, and R" represents an alkyl radical having up to about 8 carbon atoms.

While the reaction path by which the unsaturated nitrile, alcohol and water are converted to the unsaturated ester is uncertain, it is felt that the reaction proceeds by either of two mechanisms, one being nitrile hydrolysis followed by esterification by the alcohol of the acrylic acid so formed, the other being the intermediate formation of an iminoether, from nitrile and alcohol, which is subsequently hydrolyzed to ester and ammonia.

While the essential feature of the present invention involves the use of niobium pentoxide as a unique promoting agent catalyst in combination with an esterification catalyst, it is recognized that other catalyst, materials may be present along with the present catalyst without unduly affecting its operation.

In the following examples and description a single embodiment of the invention is set forth. These examples are provided for illustration only and should not be construed as a limitation of the scope of the invention. Example I indicates the results obtained when my novel promoting agent catalyst is not employed. Example II illustrates the surprising and unexpected increase in yield percentage obtained by the use of the present promoting catalyst.

Example I

A liquid containing equal molar proportions of acrylonitrile, ethyl alcohol, and water is vaporized in a tubular Vycor reactor and passed at a contact time of 33 sec. over 200 ml. of granular Davison Grade 70 silica gel at 315° C. Reaction products are recovered by countercurrent scrubbing of reactor effluent with an aqueous solution containing 1% MCl and 0.01% hydroquinone. Gas chromatographic analysis of the product shows that less than 1% of the acrylonitrile and ethyl alcohol fed has been converted to ethyl acrylate.

Example II

The reaction of Example I is repeated except that the 200 ml. of catalyst consists of granular Davison Grade 70 silica gel containing 10% by weight of niobium pentoxide. The catalyst is prepared by evaporation of an aqueous solution containing the required amount of niobium oxalate in the presence of the silica support and then calcining the resulting mass at 450° C. to decompose the oxalate to the oxide. Collection of the product mixture and analysis, as in Example I, shows that 6% of the acrylonitrile and ethyl alcohol fed has been converted to ethyl acrylate. Thus the activity of the silica gel is greatly enhanced through the promoting effect of niobium pentoxide.

The esters of acrylic acid, especially the methyl and ethyl esters, find wide application and use in the formulation of a variety of polymeric materials. The previously described one-step process effects substantial savings in both plant investment and production costs for the manufacture of these monomers.

Although the invention has been described in considerable detail with particular reference to a preferred embodiment thereof, variations and modifications can be effected within the spirit and scope of the invention as described hereinbefore and as defined in the appended claims.

I claim:

1. In a process for preparing a lower alkyl ester of an alpha,beta-unsaturated acid from the corresponding unsaturated nitrile, water and a lower alkanol, in the vapor phase wherein the vapor is brought into contact with a solid certification catalyst, the improvement of contacting said vapor with an additional catalyst material comprising niobium pentoxide.

2. The process of claim 1 wherein the niobium pentoxide is combined with a solid support selected from the group consisting of silica, alumina, titania, and zirconia, and mixtures thereof, and is in the calcined form, the amount of niobium pentoxide catalyst being at least about 1% by weight of the total catalyst.

3. The process of claim 2 in which the vapor is in contact with said total catalyst for at least about 1 second, and at a temperature of from about 150° C. to 500° C.

4. The process of claim 1 in which said nitrile is acrylonitrile or methacrylonitrile and said alkanol is methanol or ethanol.

5. The process of claim 2 wherein said process consists of one step and said nitrile is acrylonitrile and said alkanol is methanol or ethanol.

References Cited

UNITED STATES PATENTS 2,913,486  11/1959  Veatch et al. _____ 260—486
3,022,338  2/1962   Enk et al. _____ 260—486

LORRAINE A. WEINBERGER, Primary Examiner

A. P. HALLUIN, Assistant Examiner

U.S. Cl. X.R.

252—456, 461, 464; 260—410.9

PO-1050
(5/69)

UNITED STATES PATENT OFFICE
CERTIFICATE OF CORRECTION

Patent No. 3,466,320      Dated September 9, 1969

Inventor(s) Charles W. Hargis

It is certified that error appears in the above-identified patent and that said Letters Patent are hereby corrected as shown below:

Column 4, Claim 1, line 24, "certification" should read
- - esterification - -

SIGNED AND
SEALED
FEB 24 1970

(SEAL)
Attest:

Edward M. Fletcher, Jr.
Attesting Officer

WILLIAM E. SCHUYLER, JR.
Commissioner of Patents